July 12, 1960  B. SCHUBERT  2,944,654
DEVICE FOR ALIGNING FILTER ROD PORTIONS IN
FILTER TIP CIGARETTE MAKING MACHINES
Filed July 24, 1959  2 Sheets-Sheet 1

July 12, 1960   B. SCHUBERT   2,944,654
DEVICE FOR ALIGNING FILTER ROD PORTIONS IN
FILTER TIP CIGARETTE MAKING MACHINES
Filed July 24, 1959   2 Sheets-Sheet 2

United States Patent Office
2,944,654
Patented July 12, 1960

2,944,654

DEVICE FOR ALIGNING FILTER ROD PORTIONS IN FILTER TIP CIGARETTE MAKING MACHINES

Bernhard Schubert, Hamburg-Lohbrugge, Germany, assignor to Hauni-Werke Körber & Co. K.G., Hamburg-Bergedorf, Germany Filed July 24, 1959, Ser. No. 829,362

Claims priority, application Germany July 25, 1958

5 Claims. (Cl. 198—32)

The invention relates to filter tip cigarette making machines and is particularly concerned with an improvement of the machine disclosed in Rudszinat and Ricke's patent application Serial No. 705,363, filed on December 26, 1957.

In this prior patent application is disclosed a machine for depositing rod shaped articles, for instance filter mouthpiece bodies or the like, in a particular manner into grooves of a conveyor member. More specifically, rods of multiple final length are placed upon a rotary drum provided on its circumference with axially extending grooves into which latter the mentioned rod-shaped articles are placed and then are cut into lengths which are equal to the desired double final length. A plurality of these rod-shaped portions are conveyed transversely to their longitudinal direction and are axially displaced by means of guide members or the like in such a manner that they are aligned one behind the other to form a continuous row, whereby between the receiving grooves of the rotary drum of a filter mouthpiece cigarette making machine a number of additional grooves are provided for receiving other rod-shaped articles.

The filter body depositing drum serves at the same time for the reception of rods from a magazine which rods are to cut into pieces, for staggering these rods and for aligning and transferring the rod portions to a succeeding cigarette machine drum, whereby the number of grooves of the depositing drum is not divisible by the number of the rod portions which are cut from a single rod. One may also proceed by providing in combination with the filter body depositing drum a filter body aligning drum which receives the filter rod portions to be aligned from the filter body depositing drum and delivers the same again to an empty groove of the filter body depositing drum.

In both cases the cut filter rod portion are slidably moved by guide bars toward the center and also are moved back and forth. In order to avoid this back and forth movement the prior application provides that the filter rod portions, which are to be slidably displaced, are arranged in trough-like members which are also pivotally and rotatably mounted in order that in this manner they can be aligned with the centrally arranged groove portions. However, also in this type of arrangement the filter rod portions have to be slidably displaced toward the center of the drum.

It was discovered that particularly soft and poorly prepared filter rods are difficult to be slidably moved in this manner and particularly the operation upon filter rods which are provided with a wrapper which becomes sticky when subjected to heat. Such a wrapper will flare outwardly at the places where the filter rod is cut and makes the wall of the groove rough so that a slidable movement of the filter rod portions is extremely difficult.

In accordance with the present invention any slidable movement of the filter bodies is eliminated in that the trough portions, which receive the filter rod portions to be slidably moved, are arranged in such manner that they are movable in a controllable manner in the direction and in opposite direction of movement of the conveyor drum so that the filter rod portions from a coaxial position with respect to one another can be displaced or staggered to a circumferential spaced position with respect to the rigid trough portions arranged in the center of the drum, whereby the spacing is equal to distance between the grooves. This can be accomplished in a simple manner by an oscillating movement of the trough portions about an angle of 180° and about radially directed axes of rotation whereby these axes are arranged in the radial planes of the inner end face of the filter rod portions and arranged one half division away from the axes of the filter rod portions.

Another object of the invention is to provide means which permit the movable trough portions to perform a combined oscillating movement and back and forth movement into the desired position.

The invention will now be described with reference to the accompanying drawings which illustrate diagrammatically two embodiments of the invention in which the operational movements are illustrated on a drum whose circumference is illustrated in a rolled out position.

Figure 1:
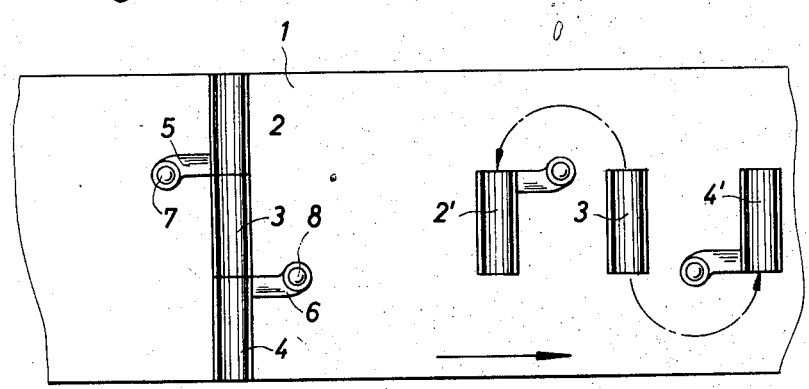
Fig. 1 illustrates an embodiment of the invention in which the trough portions on the circumference of the rotatable drum are only pivotally mounted.
Figure 3:
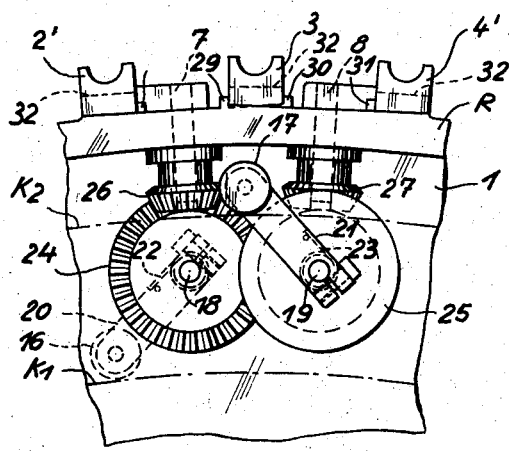
Fig. 3 is an end elevation view of the device shown in Fig. 1.

Referring to the drawing, Fig. 1 illustrates a portion of the circumference of the grooved rotary conveyor drum 1, in which each groove is represented by three axially aligned trough portions 2, 3 and 4 which are provided at each third groove of the drum. The center trough portion 3 is rigidly secured to the circumference of the body of the drum; but the two outer trough portions 2 and 4 are mounted on radially directed shafts 7 and 8 respectively (Fig. 3). These shafts 7 and 8 are arranged at a point spaced one half of the distance between the grooves with respect to the axis of the central trough portion 3. The shaft 7 is arranged spaced rearwardly of the trough portion 3 with respect to the direction of rotation of the drum and the shaft 8 is arranged one half the distance between the grooves forwardly in the direction of rotation of the drum 1 as indicated by the arrow in Fig. 1. The shafts 7 and 8 are also positioned in such a manner that they are placed approximately in a radial plane of the drum which contains the inner end faces of the trough portions 2 and 3 which are pivotally mounted in these planes. The pivotal movement of the trough portions 2 and 4 is accomplished by rotating the shaft 7 and 8 about an angle of 180° so that the trough portions 2 and 4 can be placed in the positions 2' and 4' respectively. In these positions they are arranged in circumferential alignment with the center trough portion 3, and a slidable displacement of the filter bodies in these trough portions 2 and 4 is not necessary.

Figure 2:
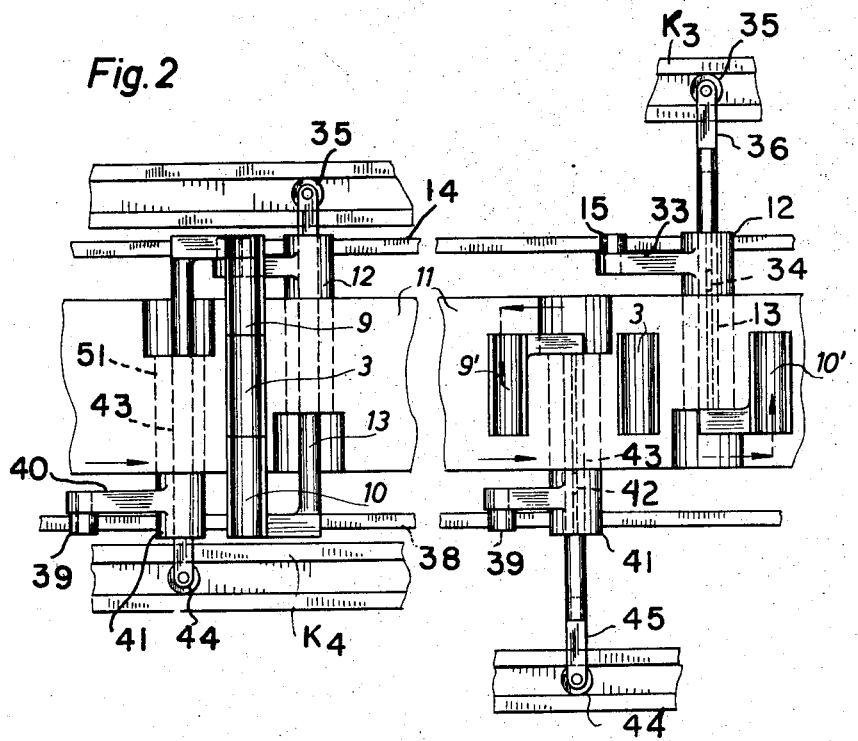
Fig. 2 illustrates another embodiment of the invention in which the movable end trough portions perform a combined oscillating and back and forth movement in order to be placed into and out of alignment with the fixed central trough portion.
Figure 4:
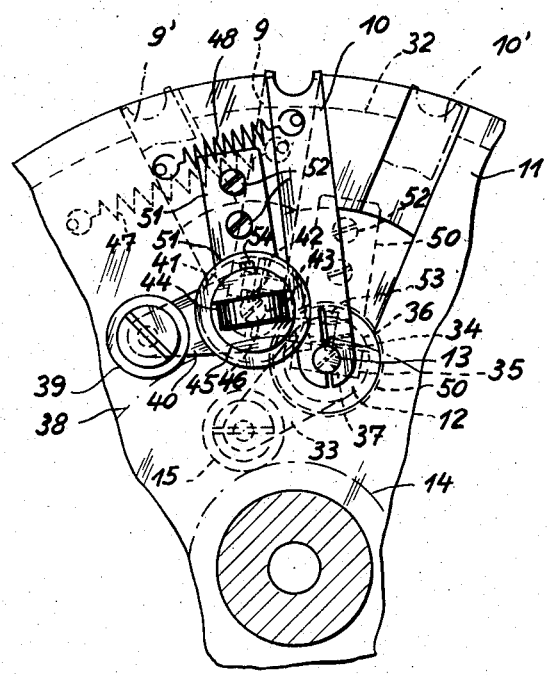
Fig. 4 is an end elevation view of the device shown in Fig. 2.

Referring to Figs. 2 and 4 which disclose another embodiment of the invention it will be noted that the outer two trough portions 9 and 10 are pivotally mounted about the shafts 12 which are positioned parallel to the axis of rotation of the filter body receiving drum 11 and the trough portions 9 and 10 may be pivotally moved into the positions 9' and 10' respectively, and at the same time or thereafter the trough portions 9 and 10 may be moved axially back and forth. For the purpose of performing the pivotal movement about the shafts 12 the trough portions 9 and 10 are controlled during this movement by a cam in similar manner as it is done in the previously mentioned patent application. The additional movement in the direction of the axis of the drum may also be controlled by the employment of cams. For this purpose the shafts 12 are constructed as tubular shafts and are rotatably mounted in the body of the drum. The bores of these tubular shafts 12 contain a slidable rod 13 connected by a key and groove connection with the bore of the shafts so that the slidable rods 13 are secured against rotation with respect to the shafts 12. On these rods 13 are mounted the trough portions 9 and 10 respectively.

Fig. 3 shows the trough portions 2 and 4 in the position 2', 4' of Fig. 1, whereby appropriately formed cams $K_1$ and $K_2$ (indicated only by broken lines for the sake of clarity) swing the axes of the shafts 18, 19 with the aid of rollers 16, 17 and adjustably positioned levers 20, 21 on the shafts 18, 19 against the force of the springs 22, 23. The shafts 18, 19 are pivotally mounted in drum 1. Through bevel wheels 24, 25 secured to shafts 18, 19 and bevel gears 26, 27 secured to shafts 7, 8, the latter (to whose free end the trough 2, 4 is secured) is turned through 180°. The shafts 7, 8 are pivotally mounted in the external ring R of drum 1. By moving back levers 20, 21, the troughs 2, 4 move from position 2', 4' back again into axial alignment with the fixed trough 3. The end positions of the movable troughs 2, 4 can be limited by the stops 28, 29, 30, 31.

Fig. 4 shows the trough portions 9 and 10 in the axial position in accordance with Fig. 2. With the turning of the drum 11, the fixed cam 14 (indicated only by broken lines for the sake of clarity) acting through roller 15, lever 33, sleeve 12, wedge 34 and shaft 13 swings trough 10, attached to the last-mentioned, from its starting point into position 10', whereby in addition a movement of trough 10 axially through the action of a fixed cam plate $K_3$ (Fig. 2) occurs with the aid of a roller 35 pivotally mounted on a guide bush 36 and a clamping screw 37 on shaft 13 to which is secured trough 10.

A fixed cam 38 (indicated only by broken lines for the sake of clarity) acting through roller 39, lever 40, sleeve 41, wedge 42 and shaft 43 drives trough 9, attached to the last-mentioned, out of its starting position into position 9', whereby there takes place a movement of the trough in the axial direction through the action of a fixed cam plate $K_4$ (Fig. 2) with the aid of a roller 44, pivotally mounted on a guide bush 45, and a clamping screw 46 on shaft 43 to which is secured trough 9.

The springs 47 and 48 press the rollers 39 and 15 of troughs 9 and 10 against the cams 38 and 14. The troughs 9 and 10 as well as the trough 3 fixed to the drum circumference and the circumferential parts of drum 11 between the troughs are provided with a slot 32 so that known fingers (not shown) can reach under the filter rod portions so as to assist the lifting of the same from the troughs to the supply position. If desired, the trough portions 2, 3 and 4 shown in Fig. 1 may also be provided with a slot 32.

The sleeves 12 and 41 can turn in the drum body but are so housed that they cannot slide in an axial direction. The guide bushes 36 and 45, on the other hand, cannot turn but are housed in flanged bearings 50 and 51, which are fixed by screws 52 to the side wall of the drum, and which allow these guide bushes to slide in an axial direction. The guide bushes 36 and 45 are provided with wedges 53 and 54 which engage with longitudinal grooves of the flange bearing bore.

As referred to at the beginning, with both forms of construction the object is to manipulate filter rods, the rod portions of which after cutting are difficult of sliding since they tend to stick slightly to the troughs. On the other hand, therefore, they remain unslideable in the troughs until they are lifted out. In this way, other filter rods or rod portions are held securely in their position in the troughs in that the trough flanks are carried by a small amount over the diameter of the pitch circle so that the rod portions are embraced by more than half.

What I claim is:

1. A conveying device for rod-shaped articles, such as filter bodies used in the manufacture of filter tip cigarettes, including a rotary drum provided on its circumference with axially arranged trough-shaped members for the reception of said rod-shaped articles, each of said members being divided so as to form a plurality of separate axially aligned parts, the center part of which is fixedly attached to the circumference of said drum, means for moving the other parts of said trough-shaped members into and out of axial alignment with said fixed center part, said means including movable members operatively connected with said other parts of said trough-shaped members to move said movable parts from their axially aligned position into a position in which all parts are arranged in circumferential spaced position along the circumference of the drum, said movement of the movable trough parts taking place in a forward direction and in opposite direction with respect to the direction of rotation of said drum.

2. A conveying device according to claim 1, including radially mounted shafts on said rotary drum, means for mounting said movable trough parts on said shafts, and means for rotating said shafts with said trough parts thereon about an angle of 180° about the axes of said radially mounted shafts.

3. A conveying device according to claim 1, including rotatable shafts mounted in said rotary drum and extending parallel to the axis of rotation of said drum, means for connecting said movable trough parts with said shaft, said means being constructed to rotate said trough parts about the axes of said shafts and also to move said trough parts lengthwise of the axes of said shafts.

4. A conveying device according to claim 1, including rotatable shafts mounted in said rotary drum and extending parallel to the axis of rotation of said drum, means for connecting said movable trough parts with said shaft, said means being constructed to rotate said trough parts about the axes of said shafts and also to move said trough parts lengthwise of the axes of said shafts, and cam means controlling the movements of said movable trough parts during their rotative movements and during their lengthwise movements.

5. A conveying device according to claim 1, including rotatable shafts mounted in said rotary drum and extending parallel to the axis of rotation of said drum, means for connecting said movable trough parts with said shaft, said means being constructed to rotate said trough parts about the axes of said shafts and also to move said trough parts lengthwise of the axes of said shafts, and stationary cam means controlling the movements of said movable trough parts during their rotative movements and during their lengthwise movements when said rotary drum is rotated.

References Cited in the file of this patent

UNITED STATES PATENTS 1,824,414    Stein    Sept. 22, 1931